United States Patent
Kim et al.

(10) Patent No.: US 10,418,178 B2
(45) Date of Patent: Sep. 17, 2019

(54) DIELECTRIC COMPOSITION AND MULTILAYER CERAMIC CAPACITOR CONTAINING THE SAME

(71) Applicant: SAMSUNG ELECTRO-MECHANICS CO., LTD., Suwon-Si, Gyeonggi-Do (KR)

(72) Inventors: Jin Woo Kim, Suwon-Si (KR); Jong Ho Lee, Suwon-Si (KR); Min Gi Sin, Suwon-Si (KR); Hak Kwan Kim, Suwon-Si (KR); Chin Mo Kim, Suwon-Si (KR); Chi Hwa Lee, Suwon-Si (KR); Hong Seok Kim, Suwon-Si (KR); Woo Sup Kim, Suwon-Si (KR); Chang Hwa Park, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/684,645

(22) Filed: Aug. 23, 2017

(65) Prior Publication Data

US 2018/0130601 A1  May 10, 2018

(30) Foreign Application Priority Data

Nov. 9, 2016 (KR) .......... 10-2016-0148475

(51) Int. Cl.
*C04B 35/468* (2006.01)
*C04B 35/628* (2006.01)
(Continued)

(52) U.S. Cl.
CPC .......... *H01G 4/1227* (2013.01); *C01G 23/00* (2013.01); *C01G 23/006* (2013.01);
(Continued)

(58) Field of Classification Search
CPC .... C01G 23/00; C01G 23/006; C01G 45/006; C01P 2002/64; C01P 2002/80;
(Continued)

(56) References Cited

U.S. PATENT DOCUMENTS

| 2002/0013213 A1* | 1/2002 | Sato | ............. | H01G 4/1227 |
| | | | | 501/139 |
| 2004/0105214 A1* | 6/2004 | Nakamura | ..... | H01G 4/1227 |
| | | | | 361/321.2 |

(Continued)

FOREIGN PATENT DOCUMENTS

| JP | 07-078511 A | 3/1995 |
| JP | 2003-048774 A | 2/2003 |

(Continued)

OTHER PUBLICATIONS

Stabilized Cubic Zirconia Addition Effect on Barium Titanate—2013.*

(Continued)

*Primary Examiner* — Timothy J Thompson
*Assistant Examiner* — Guillermo J Egoavil
(74) *Attorney, Agent, or Firm* — Morgan, Lewis & Bockius LLP

(57) ABSTRACT

A multilayer ceramic capacitor includes: a ceramic body including dielectric layers and first and second internal electrodes disposed to face each other with respective dielectric layers interposed therebetween; and first and second external electrodes disposed on an external surface of the ceramic body, wherein the dielectric layer contains a barium titanate-based powder particle having a core-shell structure including a core and a shell around the core, the shell having a structure in which titanium is partially substituted with an element having the same oxidation number as that of the titanium in the barium titanate-based powder (Continued)

particle and having an ionic radius different from that of the titanium in the barium titanate-based powder particle, and the shell covers at least 30% of a surface of the core.

13 Claims, 2 Drawing Sheets

(51) Int. Cl.
| | | |
|---|---|---|
| H01G 4/10 | (2006.01) | |
| H01G 4/12 | (2006.01) | |
| H01G 4/33 | (2006.01) | |
| H01L 21/00 | (2006.01) | |
| H01G 4/30 | (2006.01) | |
| C01G 23/00 | (2006.01) | |
| H01G 4/232 | (2006.01) | |
| H01G 4/248 | (2006.01) | |

(52) U.S. Cl.
CPC ...... *C04B 35/4682* (2013.01); *C04B 35/6281* (2013.01); *C04B 35/62805* (2013.01); *C04B 35/62821* (2013.01); *H01G 4/10* (2013.01); *H01G 4/30* (2013.01); *H01G 4/33* (2013.01); *C01P 2004/64* (2013.01); *C01P 2004/80* (2013.01); *C04B 2235/3206* (2013.01); *C04B 2235/3208* (2013.01); *C04B 2235/3215* (2013.01); *C04B 2235/3217* (2013.01); *C04B 2235/3224* (2013.01); *C04B 2235/3225* (2013.01); *C04B 2235/3227* (2013.01); *C04B 2235/3229* (2013.01); *C04B 2235/3234* (2013.01); *C04B 2235/3244* (2013.01); *C04B 2235/3248* (2013.01); *C04B 2235/3249* (2013.01); *C04B 2235/3262* (2013.01); *C04B 2235/3272* (2013.01); *C04B 2235/3275* (2013.01); *C04B 2235/3293* (2013.01); *C04B 2235/442* (2013.01); *H01G 4/232* (2013.01); *H01G 4/248* (2013.01)

(58) Field of Classification Search
CPC .............. C01P 2002/52; C01P 2002/72; C01P 2006/12; C01P 2006/40; C04B 35/468; C04B 35/628; C04B 35/4682; C04B 35/62805; C04B 35/6281; C04B 35/62821; C04B 35/62886; C04B 2235/3215; C04B 2235/3234; C04B 2235/3248; C04B 2235/3293; C04B 2235/442; H01G 4/10; H01G 4/12; H01G 4/1227; H01G 4/30; H01G 4/33; H01G 4/232; H01G 4/248; H01L 21/00; H01L 28/56
USPC ........................................ 361/301.4; 501/137
See application file for complete search history.

(56) References Cited

U.S. PATENT DOCUMENTS

| | | | | |
|---|---|---|---|---|
| 2005/0186687 | A1* | 8/2005 | Lee .......................... | H01L 28/56 |
| | | | | 438/3 |
| 2009/0207551 | A1 | 8/2009 | Suzuki | |
| 2011/0111947 | A1* | 5/2011 | Natsui .................. | C01G 23/006 |
| | | | | 501/137 |
| 2012/0113562 | A1 | 5/2012 | Kang et al. | |
| 2012/0252657 | A1* | 10/2012 | Sato ..................... | C04B 35/4682 |
| | | | | 501/139 |
| 2016/0181017 | A1* | 6/2016 | Kamigaki ................ | C08K 3/00 |
| | | | | 174/260 |

FOREIGN PATENT DOCUMENTS

| | | | | | |
|---|---|---|---|---|---|
| JP | | 2007091549 A | * | 4/2007 | ............. C01G 23/00 |
| JP | | 4582973 B2 | * | 11/2010 | ............. C04B 35/46 |
| KR | 10-2004-0047650 A | | | 6/2004 | |
| KR | 10-2012-0073638 A | | | 7/2012 | |
| KR | 10-2012-0089549 A | | | 8/2012 | |
| KR | 10-2013-0073670 A | | | 7/2013 | |
| WO | | 2008/068999 A1 | | 6/2008 | |
| WO | WO-2014207900 A1 | | * | 12/2014 | ......... C04B 35/4682 |

OTHER PUBLICATIONS

Ionic Radius—wikipedia_pp. 1-11_Nov. 6, 2015.*
Periodic Table with Oxidation—Jan. 2016.*
Notice of Office Action issued in corresponding Korean Patent Application No. 10-2016-0148475, dated Sep. 8, 2017 (With full English translation).

* cited by examiner

A-A'

DIELECTRIC COMPOSITION AND MULTILAYER CERAMIC CAPACITOR CONTAINING THE SAME

CROSS-REFERENCE TO RELATED APPLICATION(S)

This application claims the benefit of priority to Korean Patent Application No. 10-2016-0148475, filed on Nov. 9, 2016 in the Korean Intellectual Property Office, the disclosure of which is incorporated herein by reference in its entirety.

BACKGROUND

1. Field

The present disclosure relates to a dielectric composition having high permittivity and excellent reliability, and a multilayer ceramic capacitor including the same.

2. Description of Related Art

Generally, electronic components that include a ceramic material, such as a capacitor, an inductor, a piezoelectric device, a varistor, a thermistor, or the like, include a ceramic body formed of a ceramic material, internal electrodes formed in the ceramic body, and external electrodes installed on a surface of the ceramic body so as to be connected to the internal electrodes.

Among such ceramic electronic components, a multilayer ceramic capacitor includes a plurality of stacked dielectric layers, internal electrodes disposed to face each other with respective dielectric layers interposed therebetween, and external electrodes electrically connected to the internal electrodes.

Multilayer ceramic capacitors have been widely used as a component for a mobile communications device, such as a computer, a personal data assistant (PDA), a mobile phone, or the like, due to advantages thereof such as a small size, high capacitance, ease of mountability, or the like.

In general, a multilayer ceramic capacitor is manufactured by stacking a layer of conductive paste for an internal electrode and a layer of dielectric paste using a sheet method, a printing method, or the like, and simultaneously sintering the stacked paste layers.

Electrical features of multilayer ceramic capacitors maybe changed according to the type and features of dielectric powder contained in the dielectric paste.

Recently, high capacitance is required in multilayer ceramic capacitors, and in order to implement high capacitance, there is a need to secure high permittivity under conditions in which grain growth does not occur. Particularly, in a case of performing complete sintering, grain growth essentially occurs due to atomization of a dielectric material, and thus, a decrease in capacitance in a high electric field is essential.

Therefore, there is a need to develop a dielectric composition capable of being densified even at high temperature, without accompanying grain growth, and capable of simultaneously reducing a decrease in permittivity due to lack of grain growth.

SUMMARY

An aspect of the present disclosure may provide a dielectric composition having high permittivity and excellent reliability, and a multilayer ceramic capacitor using the same.

According to an aspect of the present disclosure, a multilayer ceramic capacitor may include: a ceramic body including dielectric layers and first and second internal electrodes disposed to face each other with respective dielectric layers interposed therebetween; and first and second external electrodes disposed on an external surface of the ceramic body, wherein the dielectric layer contains a barium titanate-based powder particle having a core-shell structure including a core and a shell around the core, the shell having a structure in which titanium is partially substituted with an element having the same oxidation number as that of the titanium in the barium titanate-based powder particle and having an ionic radius different from that of the titanium in the barium titanate-based powder particle, and the shell covering at least 30% of a surface of the core.

According to another aspect of the present disclosure, a dielectric composition may contain a barium titanate-based powder particle having a core-shell structure including a core and a shell around the core, wherein the shell has a structure in which titanium is partially substituted with an element having the same oxidation number as that of the titanium in the barium titanate-based powder particle and having an ionic radius different from that of the titanium in the barium titanate-based powder particle, and the shell contains at least one of Sn, Zr, and Hf.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

Hereinafter, a dielectric composition according to the present disclosure and a multilayer ceramic capacitor using the same will be described with reference to the accompanying drawings.

Figure 1:
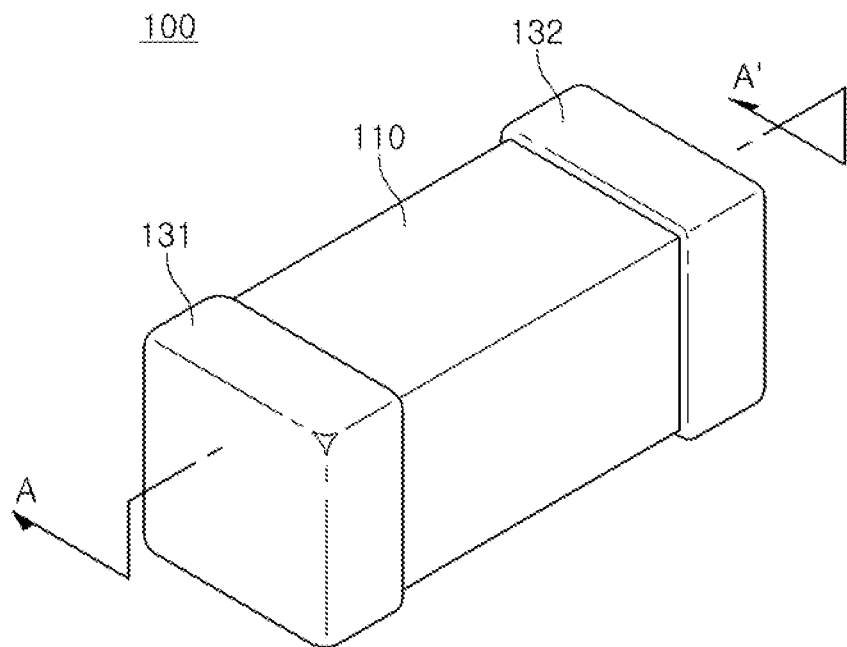
FIG. 1 is a schematic perspective view illustrating a multilayer ceramic capacitor according to an exemplary embodiment in the present disclosure.

FIG. 1 is a schematic perspective view illustrating a multilayer ceramic capacitor according to an exemplary embodiment in the present disclosure.

Figure 2:
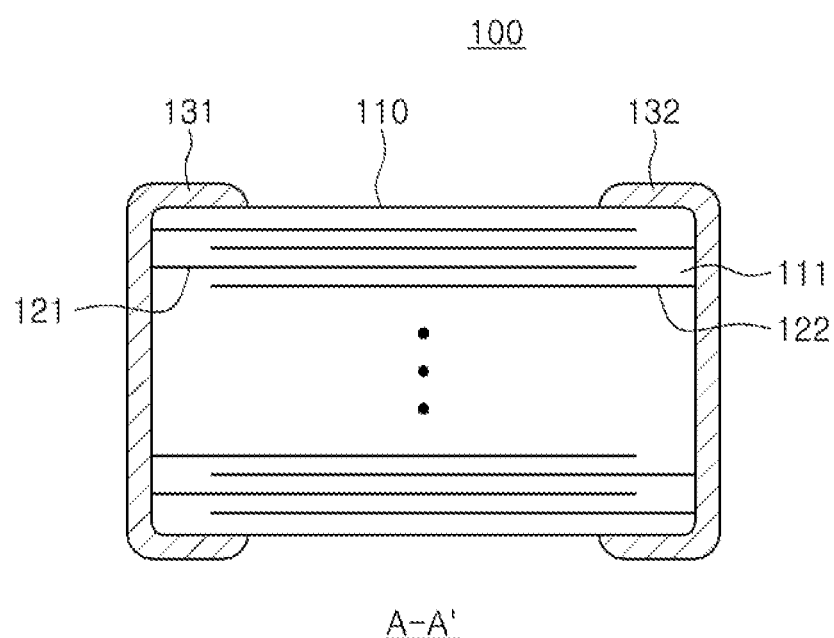
FIG. 2 is a schematic cross-sectional view illustrating the multilayer ceramic capacitor taken along line A-A' of FIG. 1.

FIG. 2 is a schematic cross-sectional view illustrating the multilayer ceramic capacitor taken along line A-A' of FIG. 1.

Figure 3:
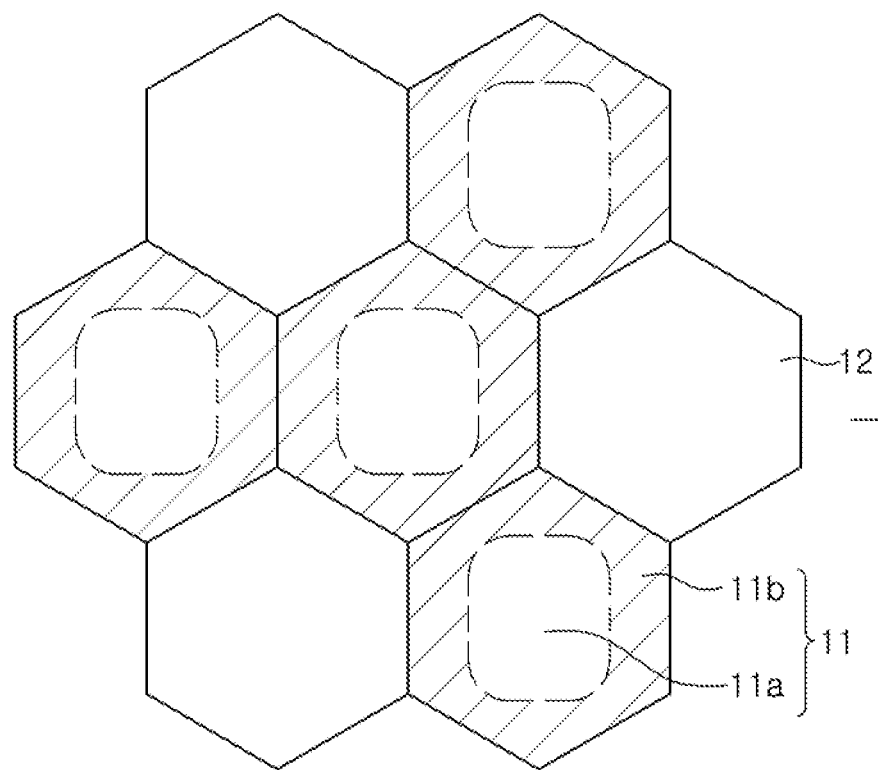
FIG. 3 is a view schematically illustrating dielectric grains contained in a dielectric layer in the multilayer ceramic capacitor according to the exemplary embodiment in the present disclosure.

FIG. 3 is a view schematically illustrating dielectric grains contained in a dielectric layer in the multilayer ceramic capacitor according to the exemplary embodiment in the present disclosure.

Referring to FIGS. 1 through 3, a multilayer ceramic capacitor 100 according to the exemplary embodiment in the present disclosure may include: a ceramic body 110 including dielectric layers 111 and first and second internal electrodes 121 and 122 disposed to face each other with each of the dielectric layers 111 interposed therebetween; and first and second external electrodes 131 and 132 disposed on an external surface of the ceramic body 110. The dielectric layer 111 contains a barium titanate-based powder particle having a core 11a-shell 11b structure including core 11a and shell 11b around the core 11a. The shell 11b of the barium titanate-based powder particle has a structure in which titanium is partially substituted with an element having the same oxidation number as that of the titanium in the barium titanate-based powder particle and having an ionic radius different from that of the titanium in the barium titanate-based powder particle, and the shell 11b covers at least 30% of a surface of the core 11a.

A shape of the ceramic body 110 is not limited, but generally, may be a hexahedral shape. In addition, a dimension of the ceramic body 110 is not limited, and the ceramic body may have a suitable dimension depending on intended usage. For example, the ceramic body may have dimensions of (0.6~5.6 mm)×(0.3~5.0 mm)×(0.3~1.9 mm).

A thickness of the dielectric layer 111 may be optionally changed according to capacitance design of the capacitor. According to the exemplary embodiment in the present disclosure, a thickness of a single dielectric layer after sintering may be 0.2 μm or more.

The first and second internal electrodes 121 and 122 may be stacked so that end surfaces thereof are alternately exposed to surfaces of both end portions of the ceramic body 110 opposing each other, respectively.

The first and second external electrodes 131 and 132 may be formed on both end portions of the ceramic body 110 and electrically connected to the exposed end surfaces of the first and second internal electrodes 121 and 122 that are alternately disposed, thereby configuring a capacitor circuit.

A conductive material contained in the first and second internal electrodes 121 and 122 is not limited, but may be, for example, nickel (Ni).

A thickness of the first and second internal electrodes 121 and 122 may be appropriately determined depending on intended usage, or the like, but is not limited. For example, the thickness may be within a range of 0.1 to 5 μm or within a range of 0.1 to 2.5 μm.

A conductive material contained in the first and second external electrodes 131 and 132 is not limited, but nickel (Ni), copper (Cu), or alloys thereof may be used.

A thickness of the first and second external electrodes 131 and 132 may be appropriately determined depending on intended usage, or the like, but is not limited. For example, the thickness may be within a range of 10 to 50 μm.

The dielectric layer 111 configuring the ceramic body 110 may contain a dielectric composition according to another exemplary embodiment in the present disclosure.

The dielectric composition may contain a barium titanate-based powder particle having a core-shell structure including a core and a shell around the core. The shell of the barium titanate-based powder particle may have a structure in which titanium is partially substituted with an element having the same oxidation number as that of the titanium in the barium titanate-based powder particle and having an ionic radius different from that of the titanium in the barium titanate-based powder particle, and the shell may contain at least one of Sn, Zr, and Hf.

The dielectric composition according to another exemplary embodiment in the present disclosure will be described in more detail below.

According to the exemplary embodiment in the present disclosure, the dielectric layer 111 may contain the barium titanate-based powder particle having the core 11a-shell 11b structure including a core 11a and a shell 11b around the core 11a, and the shell 11b may have the structure in which titanium is partially substituted with an element having the same oxidation number as that of the titanium in the barium titanate-based powder particle having an ionic radius different from that of the titanium in the barium titanate-based powder particle, and the shell 11b may cover at least 30% of the surface of the core 11a.

The barium titanate-based powder particle is not limited. For example, the barium titanate-based powder particle may be a $BaTiO_3$ powder in which titanium is partially substituted with an element.

The core 11a may be formed of $BaTiO_3$, and may further contain other additives.

The shell 11b may be represented by $Ba(Ti_{1-x}M_x)O_3$, wherein M is at least one of Sn, Zr, and Hf.

According to the exemplary embodiment in the present disclosure, the permittivity of the dielectric composition may be increased by partially substituting titanium in the shell 11b with an element of which the oxidation number is the same as that of the titanium in the barium titanate-based powder particle but the ionic radius is different from that of the titanium in the barium titanate-based powder particle to change a structure generally having a cubic phase to a lattice structure and convert the cubic phase to a phase having a dipole moment, thereby securing high permittivity without grain growth.

A method of partially substituting titanium with the element of which the oxidation number is the same as that of titanium but the ionic radius is different from that of titanium is not limited. For example, the substitution may be performed by coating or doping.

The element of which the oxidation number is the same as that of titanium but the ionic radius is different from that of titanium is not limited, but may be, for example, at least one of Sn, Zr, and Hf.

That is, the shell 11b may be represented by $Ba(Ti_{1-x}M_x)O_3$, wherein M is at least one of Sn, Zr, and Hf.

A molar ratio (Ba/Ti) of Ba to Ti may be increased by partially substituting titanium with the element of which the oxidation number is the same as that of titanium but the ionic radius is different from that of titanium in the shell part 11b, such that grain growth of a dielectric grain may be suppressed.

The molar ratio (Ba/Ti) of Ba to Ti may be 1.0150 or more.

According to the exemplary embodiment in the present disclosure, since a molar ratio (Ba/Ti) of Ba to Ti is high (1.0150 or more), at the time of sintering the dielectric composition, the dielectric composition may be adjusted so as to be densified while suppressing grain growth of the dielectric composition, such that excellent withstand voltage characteristics may be obtained, reliability may be improved, and the DC-bias characteristics may also be excellent.

Further, the dielectric composition may have higher permittivity than that of a general dielectric composition by allowing the dielectric composition to be densified while suppressing grain growth, such that a high capacitance multilayer ceramic capacitor may be implemented.

According to the exemplary embodiment in the present disclosure, the shell 11b may cover at least 50% of the surface of the core 11a before sintering.

The shell 11b may cover at least 50% of the surface of the core 11a before sintering and cover at least 30% of the surface of the core 11a after sintering, such that densification of the dielectric composition may more suitably proceed while suppressing grain growth at the time of sintering.

In detail, the shell 11b may cover at least 50% of the surface of the core 11a before sintering, such that an effect of suppressing grain growth at the time of sintering may be excellent.

Further, the shell 11b may cover at least 30% of the surface of the core 11a after sintering, such that even though the internal electrodes and the dielectric layers are manufactured as thin layers, the withstand voltage characteristics may be excellent, and reliability may also be improved.

In detail, at least one substitution ingredient of Sn, Zr, and Hf, contained in the shell 11b may exist in an interface between the dielectric layer and the internal electrode and a boundary of the dielectric grain, such that the withstand voltage characteristics and high-temperature reliability may be more excellent.

A content ratio of at least one element of Sn, Zr, and Hf in the core to that in the shell 11b may be 1/5 or more before sintering and 1/10 or more after sintering.

According to the exemplary embodiment in the present disclosure, in the dielectric layer 111, the number of dielectric grains 11 of which the shell part 11b covers at least 50% of the surface of the core before sintering and covers at least 30% of the surface of the core after sintering may be 35 to 85% of the overall number of dielectric grains 11 and 12.

The number of dielectric grains 11 of which the shell 11b covers at least 50% of the surface of the core 11a before sintering and covers at least 30% of the surface of the core 11a after sintering may be within a range from 35 to 85% of the overall number of dielectric grains 11 and 12, such that the withstand voltage characteristics and high-temperature reliability may be excellent, and high capacitance may be obtained due to a low capacitance decrease rate in a high direct current (DC) electric field.

When the number of dielectric grains 11 of which the shell 11b covers at least 50% of the surface of the core before sintering and covers at least 30% of the surface of the core after sintering is less than 35% of the overall number of dielectric grains 11 and 12, such that the withstand voltage characteristics and high-temperature reliability may be deteriorated, and desired capacitance may not be obtained due to an increase in the capacitance decrease rate in a high direct current (DC) electric field.

When the number of dielectric grains 11 of which the shell 11b covers at least 50% of the surface of the core before sintering and covers at least 30% of the surface of the core after sintering is more than 85% of the overall number of dielectric grains 11 and 12, the number of dielectric grains covering the surface of the core at a high percentage is excessively high, such that capacitance may be rather deteriorated.

A thickness of the shell 11b is not limited, but may be, for example, within a range from 2 nm to 50 nm.

Hereinafter, each ingredient of the dielectric composition according to the exemplary embodiment in the present disclosure will be described in detail.

a) Base Material Powder

According to the exemplary embodiment in the present disclosure, the dielectric composition may contain the barium titanate-based powder particle having the core-shell structure as a base material powder.

The barium titanate-based powder particle may have the shell 11b having the structure in which titanium is partially substituted with the element having the same oxidation number as that of titanium and having an ionic radius different from that of titanium on the core 11a, and the shell 11b may contain at least one of Sn, Zr, and Hf.

At least one of Sn, Zr, and Hf may be coated or doped on the core 11a.

The shell 11b may have a radius corresponding to 2% to 30% of a radius of a barium titanate-based powder particle.

Nominal capacitance and actual capacitance in the DC electric field may be controlled by allowing the shell 11b to have the radius corresponding to 2% to 30% of the radius of the barium titanate-based powder particle.

The capacitance decrease rate in the high DC electric field may be decreased by allowing the shell 11b to have the radius corresponding to 2% to 30% of the radius of the barium titanate-based powder particle, such that high capacitance may be obtained.

The shell 11b may cover at least 50% of the surface of the core 11a, and the content ratio of at least one of Sn, Zr, and Hf in the core 11a to that in the shell 11b may be 1/5 or more.

b) First Accessory Ingredient

According to the exemplary embodiment in the present disclosure, the dielectric composition may contain an oxide or carbonate containing at least one of Mn, V, Cr, Fe, Ni, Co, Cu, and Zn as a first accessory ingredient.

The oxide or carbonate containing at least one of Mn, V, Cr, Fe, Ni, Co, Cu, and Zn as the first accessory ingredient may be contained in a content within a range of 0.2 to 2.0 at % based on 100 at % of the base material powder.

The first accessory ingredient may serve to decrease a sintering temperature of a multilayer ceramic capacitor using the dielectric composition, and improve high-temperature withstand voltage characteristics.

The content of the first accessory ingredient and contents of second to fifth accessory ingredients to be described below, which are contents based on 100 at % of the base material powder, may be particularly defined as mol % or at % of metal ions contained in each of the accessory ingredients.

When the content of the first accessory ingredient is less than 0.2 at %, a sintering temperature may be increased, and the high-temperature withstand voltage characteristics may be slightly deteriorated.

When the content of the first accessory ingredient is more than 2.0 at %, the high-temperature withstand voltage characteristics and room-temperature resistivity may be deteriorated.

Particularly, the dielectric composition according to the exemplary embodiment in the present disclosure may contain the first accessory ingredient having a content of 0.2 to 2.0 mol % based on 100 mol % of the base material powder, and accordingly, the dielectric composition may be sintered at a low temperature and obtain excellent high-temperature withstand voltage characteristics.

c) Second Accessory Ingredient

According to the exemplary embodiment in the present disclosure, the dielectric composition may contain a second accessory ingredient, an oxide or carbonate containing at least one of Ba and Ca.

The dielectric composition may contain the second accessory ingredient, the oxide or carbonate containing at least one of Ba and Ca, in a content of 0.0 to 3.0 at % based on 100 at % of the base material powder.

The content of the second accessory ingredient may be based on a content of one or more elements of Ba and Ca contained in the second accessory ingredient, regardless of the form of addition such as that of oxide or carbonate.

The second accessory ingredient may serve to form the core-shell structure in the dielectric composition to improve permittivity and reliability, and in a case in which the second accessory ingredient is contained in a content of 0.0 to 3.0 at % based on 100 at % of the base material powder, a dielectric composition capable of implementing high permittivity and excellent high-temperature withstand voltage characteristics may be provided.

In a case in which the content of the second accessory ingredient is more than 3.0 at % based on 100 at % of the base material powder, room-temperature permittivity may be decreased, and the high-temperature withstand voltage characteristics may also be deteriorated.

d) Third Accessory Ingredient

The dielectric composition may contain an oxide or carbonate containing Si or a glass compound containing Si as a third accessory ingredient.

The dielectric composition may further contain the third accessory ingredient, the oxide or carbonate containing Si or the glass compound containing Si, in a content of 0.2 to 5.0 at % based on 100 at % of the base material powder.

The content of the third accessory ingredient may be based on a content of a Si element contained in the third accessory ingredient, regardless of the form of addition such as that of glass, oxide, or carbonate.

The third accessory ingredient may serve to decrease a sintering temperature of a multilayer ceramic capacitor using the dielectric composition, and improve high-temperature withstand voltage characteristics.

According to the exemplary embodiment in the present disclosure, the dielectric composition may contain the third accessory ingredient, which is an oxide or carbonate containing at least one of Y, Dy, Ho, Er, Gd, Ce, Nd, Pm, Eu, Tb, Tm, Yb, Lu, and Sm.

e) Fourth Accessory Ingredient

The dielectric composition may contain the fourth accessory ingredient, the oxide or carbonate containing at least one of Y, Dy, Ho, Er, Gd, Ce, Nd, Sm, La, Tb, Yb, and Pr, in a content of 0.0 to 4.0 at % based on 100 at % of the base material powder.

According to the exemplary embodiment in the present disclosure, the fourth accessory ingredient may serve to prevent reliability of the multilayer ceramic capacitor using the dielectric composition from being deteriorated.

When the content of the fourth accessory ingredient is more than 4.0 at %, reliability may be deteriorated, or permittivity of the dielectric composition may be decreased, and the high-temperature withstand voltage characteristics may be deteriorated.

f) Fifth Accessory Ingredient

According to the exemplary embodiment in the present disclosure, the dielectric composition may contain a fifth accessory ingredient, an oxide or carbonate containing Mg or Al, which is a fixed-valence acceptor element.

The dielectric composition may contain the fifth accessory ingredient, the oxide or carbonate containing Mg or Al, which is the fixed-valence acceptor element, in a content of 0.0 to 2.0 at % based on 100 at % of the base material powder.

The fifth accessory ingredients, which are the fixed-valence acceptor element and compounds containing the same, may adjust a micro structure (suppress abnormal grain growth) in the dielectric composition and impart reduction resistance.

When the content of the fifth accessory ingredient is more than 2.0 at % based on 100 at % of the base material powder, permittivity may be decreased, which is not preferable.

In order to prepare a dielectric powder having a core-shell structure and a size of 100 nm or less, first, grain growth may proceed while doping at least one of Sn, Zr, and Hf, elements of which oxidation numbers are the same as that (4) of titanium, but ionic radii are different from that of titanium, on 10 nm-class fine seed particles manufactured by a hydrothermal synthesis method.

A thickness of a doped shell may be changed depending on alkali solubility of the doping material, and the alkali solubility may be adjusted depending on BET, a grain growth temperature, and a content of $Ba(OH)_2$ at the time of grain growth.

A doping amount may be variously adjusted in a range of 0.5 to 8.0 mol % based on titanium, and this doping amount may be determined by a target size of the powder.

More specifically, a dielectric powder having a core-shell structure in which a shell is doped may be prepared by injecting a metal oxide capable of being solubilized under an alkaline condition at the time of grain growth in a hydrothermal synthesis process.

The metal oxide may be formed of at least one of Sn, Zr, and Hf disclosed in the exemplary embodiment in the present disclosure.

As a primary process, a core having a size of 30 to 80 nm may be formed by grain growth of a $BaTiO_3$ seed having high solubility, and as a secondary process, after dissolving the metal oxide having low solubility, a $MeO_3^{2-}$ radical may be formed and react with Ba to form a $BaMeO_3$ seed.

Thereafter, the $BaMeO_3$ seed may form a doping shell in a grain growth process.

Through the above-mentioned processes, the dielectric composition may have its own permittivity increased by doping the additive to change the structure generally having the cubic phase to the lattice structure and convert the cubic phase to the phase having the dipole moment, thereby securing high permittivity without grain growth.

Further, in the multilayer ceramic capacitor manufactured by using the dielectric composition according to the exemplary embodiment in the present disclosure, since the molar ratio (Ba/Ti) of Ba to Ti is high (1.0150 or more), grain growth after sintering may be significantly decreased, and densification may proceed, such that the multilayer ceramic capacitor may have excellent withstand voltage characteristics, improved reliability, and excellent DC-bias characteristics.

As set forth above, according to exemplary embodiments in the present disclosure, the dielectric composition may have its own permittivity increased by doping the additive to change the structure generally having the cubic phase to the lattice structure and convert the cubic phase to the phase having the dipole moment, thereby securing high permittivity without grain growth.

Further, in the multilayer ceramic capacitor manufactured by using the dielectric composition according to the exemplary embodiment in the present disclosure, since the molar ratio (Ba/Ti) of Ba to Ti is high (1.0150 or more), grain growth after sintering may be significantly decreased, and densification may proceed, such that the multilayer ceramic capacitor may have excellent withstand voltage characteristics, improved reliability, and excellent DC-bias characteristics.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
a ceramic body including dielectric layers and first and second internal electrodes disposed to face each other with respective dielectric layers interposed therebetween; and
first and second external electrodes disposed on an external surface of the ceramic body,
wherein each dielectric layer contains a barium titanate-based powder particle having a core-shell structure including a core and a shell around the core, the shell including $Ba(Ti_{1-x}Sn_x)O_3$, the shell covering at least 30% of a surface of the core, and the shell having a thickness within a range of 2 nm to 50 nm.

2. The multilayer ceramic capacitor of claim 1, wherein the core includes Sn, and a content ratio of Sn in the core to that in the shell is 1/10 or more.

3. The multilayer ceramic capacitor of claim 1, wherein a molar ratio (Ba/Ti) of Ba to Ti is 1.0150 or more.

4. The multilayer ceramic capacitor of claim 1, wherein in each dielectric layer, the shell covers at least 50% of the surface of the core before sintering.

5. The multilayer ceramic capacitor of claim 4, wherein in each dielectric layer, the number of dielectric grains of which the shell covers at least 50% of the surface of the core before sintering and covers at least 30% of the surface of the core after sintering is within a range of 35 to 85% of the overall number of dielectric grains.

6. The multilayer ceramic capacitor of claim 1, wherein the core includes Sn, and a content ratio of Sn in the core to that in the shell is 1/5 or more before sintering and 1/10 or more after sintering.

7. A dielectric composition comprising:
a barium titanate-based powder particle having a core-shell structure including a core and a shell around the core;
an oxide or carbonate containing at least one of Mn, V, Cr, Fe, Ni, Co, Cu, and Zn in a content within a range of 0.2 to 2.0 at % based on 100 at % of the barium titanate-based powder particle;
an oxide or carbonate containing at least one of Ba and Ca, in a content of 0.0 to 3.0 at % based on 100 at % of the barium titanate-based powder particle;
an oxide or carbonate containing Si or a glass compound containing Si, in a content of 0.2 to 5.0 at % based on 100 at % of the barium titanate-based powder particle;
an oxide or carbonate containing at least one of Y, Dv, Ho, Er, Gd, Ce, Nd, Sm, La, Tb, Yb, and Pr, in a content of 0.0 to 4.0 at % based on 100 at % of the barium titanate-based powder particle; and
an oxide or carbonate containing Mg or Al in a content of 0.0 to 2.0 at % based on 100 at % of the barium titanate-based powder particle,
wherein the shell has a structure in which titanium is partially substituted with an element having the same oxidation number as that of titanium and having an ionic radius different from that of titanium, and the shell contains Sn.

8. The dielectric composition of claim 7, wherein the Sn is coated or doped on the core.

9. The dielectric composition of claim 7, wherein the shell has a radius within a range of 2% to 30% of a radius of the barium titanate-based powder particle.

10. The dielectric composition of claim 7, wherein the shell covers at least 50% of a surface of the core.

11. The dielectric composition of claim 7, wherein the core includes Sn, and a content ratio of the Sn in the core to that in the shell is 1/5 or more.

12. The multilayer ceramic capacitor of claim 1, wherein Sn has the same oxidation number as that of the titanium in the barium titanate-based powder particle and has an ionic radius different from that of the titanium in the barium titanate-based powder particle.

13. A multilayer ceramic capacitor comprising:
a ceramic body including dielectric layers and first and second internal electrodes disposed to face each other with respective dielectric layers interposed therebetween; and
first and second external electrodes disposed on an external surface of the ceramic body,
wherein each dielectric layer contains a barium titanate-based powder particle having a core-shell structure including a core and a shell around the core, the shell having a structure in which titanium is partially substituted with an element having the same oxidation number as that of the titanium in the barium titanate-based powder particle and having an ionic radius different from that of the titanium in the barium titanate-based powder particle, and a number of dielectric grains of which the shell covers at least 30% of the surface of the core after sintering is within a range of 35 to 85% of the overall number of dielectric grains.

* * * * *